(12) United States Patent
DiFelice et al.

(10) Patent No.: US 10,767,836 B2
(45) Date of Patent: Sep. 8, 2020

(54) LINEAR LUMINAIRE WITH OPTICAL CONTROL

(71) Applicant: SIGNIFY HOLDING B.V., Eindhoven (NL)

(72) Inventors: Eric Tyler DiFelice, Aurora, CO (US); Adam Moore Foy, Parker, CO (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/820,105

(22) Filed: Nov. 21, 2017

(65) Prior Publication Data
US 2019/0154232 A1 May 23, 2019

(51) Int. Cl.
| | |
|---|---|
| *F21V 29/00* | (2015.01) |
| *F21V 5/08* | (2006.01) |
| *G02B 27/09* | (2006.01) |
| *F21V 19/00* | (2006.01) |
| *F21V 23/00* | (2015.01) |
| *F21S 8/06* | (2006.01) |
| *F21V 5/00* | (2018.01) |
| *F21Y 115/10* | (2016.01) |
| *F21Y 103/10* | (2016.01) |
| *F21V 5/04* | (2006.01) |

(52) U.S. Cl.
CPC ............ *F21V 5/08* (2013.01); *F21S 8/06* (2013.01); *F21V 5/008* (2013.01); *F21V 19/0015* (2013.01); *F21V 23/001* (2013.01); *G02B 27/0955* (2013.01); *F21V 5/043* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS

| | | |
|---|---|---|
| D418,626 S | 1/2000 | Herst |
| D493,244 S | 7/2004 | Engel |
| D584,848 S | 1/2009 | Menke |
| D595,890 S | 7/2009 | Sabernig |
| D602,626 S | 10/2009 | Santoro |
| D607,599 S | 1/2010 | Zhou |
| D632,004 S | 2/2011 | Waldmann |
| D633,640 S | 3/2011 | Wauters |
| D645,193 S | 9/2011 | Chung |
| D645,194 S | 9/2011 | Budike, Jr. |
| D650,509 S | 12/2011 | Wegger |
| 8,070,329 B1 * | 12/2011 | Bechtel ............ F21V 5/008 362/249.02 |
| D663,882 S | 7/2012 | Muraishi |
| D671,667 S | 11/2012 | Kim |
| D700,724 S | 3/2014 | Waldmann |
| D716,489 S | 10/2014 | O'Leary |
| D733,347 S | 6/2015 | Dungan |
| D733,952 S | 7/2015 | Lay |
| D738,031 S | 9/2015 | Martins |
| 9,458,978 B2 * | 10/2016 | Motomura ............ F21S 43/26 |

(Continued)

*Primary Examiner* — Andrew J Coughlin

(57) ABSTRACT

A linear luminaire includes a housing and a light emitting diode (LED) light source attached to the housing. The luminaire further includes an over-optic piece covering the LED light source, and a lens spaced from the over-optic piece and covering the over-optic piece from view. A distribution of a light provided by the luminaire through the lens depends on the over-optic piece.

10 Claims, 12 Drawing Sheets

(56) References Cited

U.S. PATENT DOCUMENTS

| | | | | |
|---|---|---|---|---|
| 9,470,395 B2 * | 10/2016 | Marquardt | ................ | F21V 7/22 |
| D814,095 S | 3/2018 | Brandrup | | |
| 2005/0179041 A1 * | 8/2005 | Harbers | ................ | H04N 9/315 |
| | | | | 257/80 |
| 2006/0146531 A1 * | 7/2006 | Reo | ........................ | F21V 5/008 |
| | | | | 362/244 |
| 2012/0106125 A1 * | 5/2012 | Yokotani | ............ | H01L 25/0753 |
| | | | | 362/84 |
| 2012/0120044 A1 * | 5/2012 | Mizunaga | ............ | G09G 3/3614 |
| | | | | 345/211 |
| 2012/0140461 A1 * | 6/2012 | Pickard | ................ | F21V 15/013 |
| | | | | 362/225 |
| 2012/0212953 A1 * | 8/2012 | Bloom | ................ | H05B 33/089 |
| | | | | 362/223 |
| 2014/0078728 A1 * | 3/2014 | Rodgers | ................ | F21V 5/008 |
| | | | | 362/225 |
| 2014/0268727 A1 * | 9/2014 | Amrine, Jr. | ............. | F21V 17/04 |
| | | | | 362/224 |

* cited by examiner

LINEAR LUMINAIRE WITH OPTICAL CONTROL

TECHNICAL FIELD

The present disclosure relates generally to lighting fixtures, and more particularly to uniformity of light provided by lighting fixtures.

BACKGROUND

Some linear lighting fixtures, such as suspended light fixtures, emit light in directions above and/or below the lighting fixtures. In general, the down-light and up-light provided by such linear lighting fixtures may have non-uniformity lengthwise as well as widthwise. For example, such linear lighting fixtures may often have visual breaks in the emitted light because of sockets such as fluorescent bulb sockets of the lighting fixtures. Some linear lighting fixtures may also have seams between multiple lenses that are disposed along the lengths of the lighting fixtures. Approaches such as large distances between light sources and the lenses to reduce non-uniformity of the down-light may result in undesirably tall lighting fixtures.

Thus, a solution that provides uniformity of the light provided by linear lighting fixtures may be desirable.

SUMMARY

This present disclosure relates to uniformity of light provided by linear lighting fixtures. In some example embodiments, a linear luminaire includes a housing and a light emitting diode (LED) light source attached to the housing. The luminaire further includes an over-optic piece covering the LED light source, and a lens spaced from the over-optic piece and covering the over-optic piece from view. A distribution of light provided by the luminaire through the lens depends on the over-optic piece.

In another example embodiment, a linear luminaire includes a housing and a down-light light emitting diode (LED) light source attached to the housing. The down-light LED light source is positioned to emit a first light toward an area below the luminaire. The luminaire further includes an up-light LED light source and an over-optic piece covering the down-light LED light source. The up-light LED light source is positioned to emit a second light toward an area above the luminaire. The luminaire also includes a lens spaced from the over-optic piece and covering the over-optic piece from view. The over-optic piece changes a distribution of the first light passing through the over-optic piece.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein.

Figure 1:
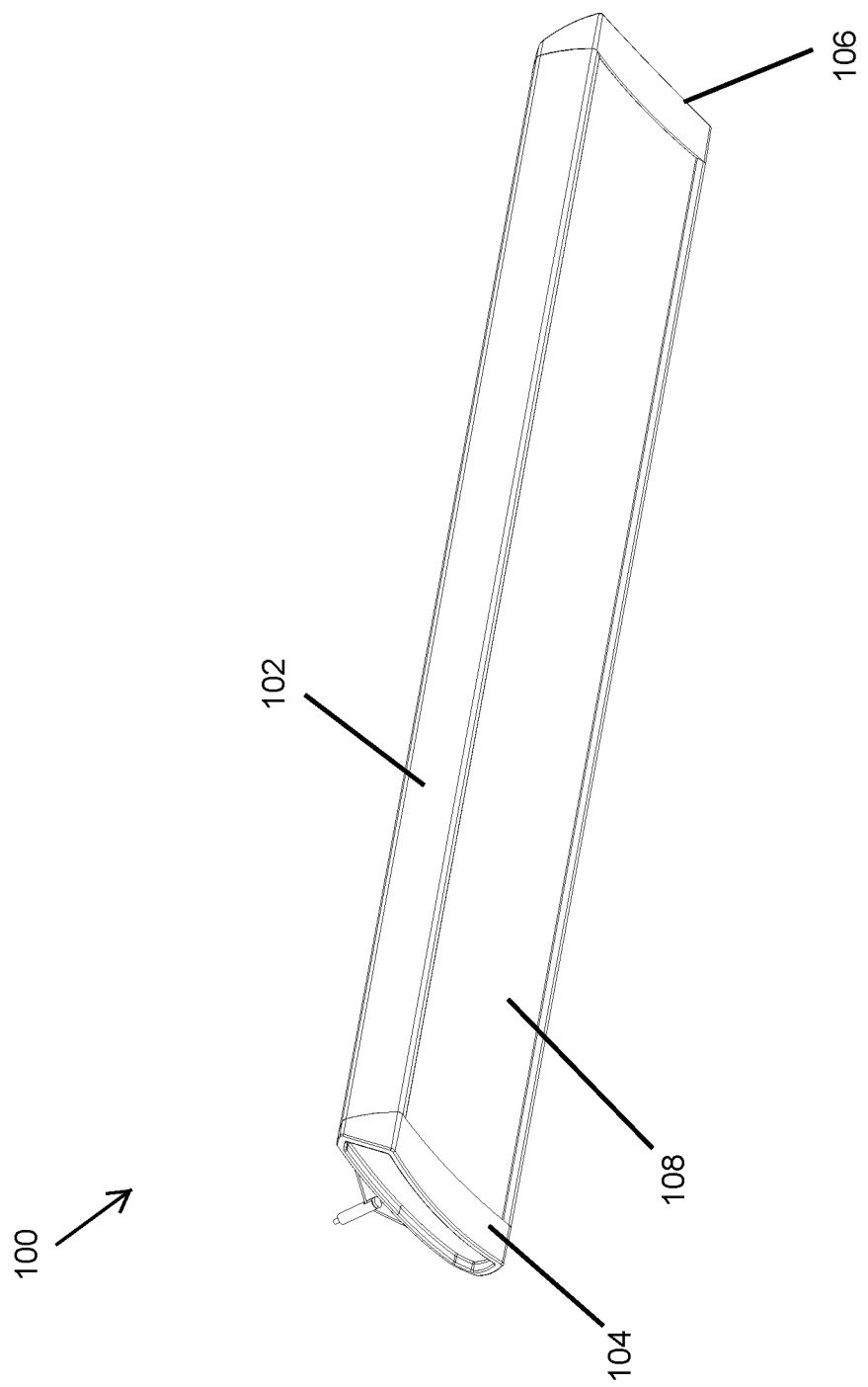
FIG. 1 illustrates a bottom isometric view of a linear luminaire according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, a light source of a low-profile luminaire utilizing optical control can uniformly light a wide, seamless, continuous lens of the low-profile luminaire. A linear light engine, an over-optic, and a seamless lens allow for even illumination along the length and width of a linear luminaire. In some example embodiments, the luminaire may provide an up-light utilizing a light engine and an over-optic that can produce high angle light to uniformly illuminate a ceiling above the luminaire.

Turning now to the drawings, FIG. 1 illustrates a bottom isometric view of a linear luminaire 100 according to an example embodiment. In some example embodiments, the linear luminaire 100 includes a housing 102, a first end cap 104, and second end cap 106. The luminaire 100 also includes a lens 108. The end cap 104 is attached to the housing 102 at a first end of the housing 102, and the end cap 106 is attached to the housing 102 at a second opposite end of the housing 102. The housing 102 may be made from aluminum or another suitable material using methods such as extrusion or other means as may be contemplated by those of ordinary skill in the art with the benefit of this disclosure.

In some example embodiments, the lens 108 extends along the length of the housing 102 between the end caps 104, 106. For example, the lens 108 may be a single piece structure. To illustrate, the lens 108 may be a continuous lens that is seamless for the entire length of the lens 108. The lens 108 may also be seamless for the entire width of the lens 108. The lens 108 may be made from plastic, an acrylic or other suitable material. For example, the lens 108 may be a thin plastic that is unrolled for attachment to the housing 102.

Figure 2:
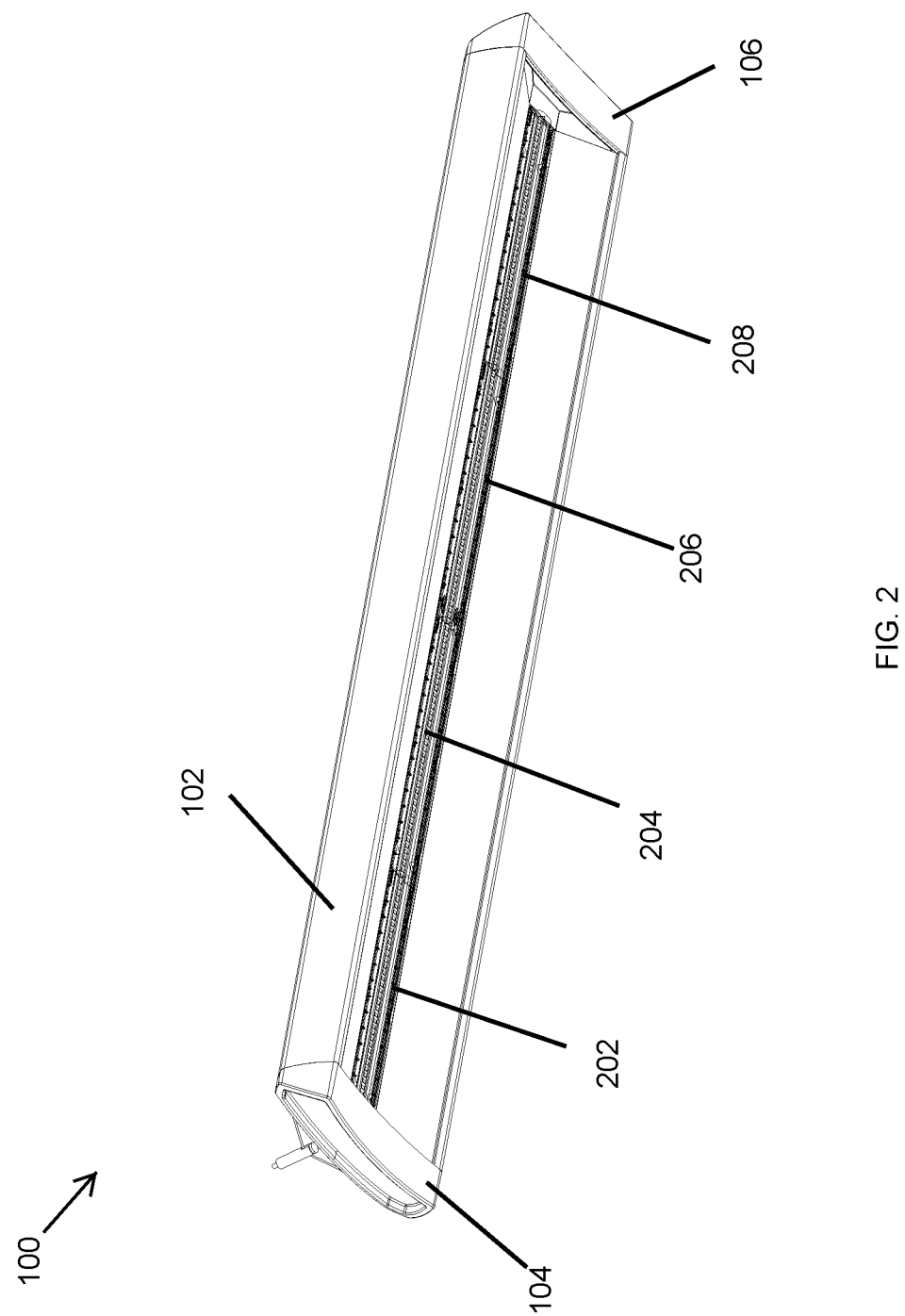
FIG. 2 illustrates the linear luminaire of FIG. 1 without the lens according to an example embodiment.

FIG. 2 illustrates the linear luminaire 100 of FIG. 1 without the lens 108 according to an example embodiment. Referring to FIGS. 1 and 2, in some example embodiments, the linear luminaire 100 includes over-optic pieces 202, 204, 206, 208 that are covered from view by the lens 108 as illustrated in FIG. 1. The over-optic pieces 202-208 control distribution of light along the length and width of the luminaire 100. For example, the over-optic pieces 202, 204, 206, 208 may cover the light source of the luminaire 100 and more evenly distribute the light provided by the light source of the luminaire 100 along the width of luminaire 100, which allows the luminaire 100 to have a low-profile. The over-optic pieces 202, 204, 206, 208 may also distribute the light more evenly such that the light does not appear excessively brighter directly beneath the light source of the luminaire 100 as compared to at other locations as viewed through the lens 108 that covers the over-optic pieces 202, 204, 206, 208.

In some example embodiments, the over-optic pieces 202-208 may be formed as a single over-optic piece that extends along the length of the housing 102. For example, a linear single-piece optic that is seamless along the length of the housing 102 may be used instead of the individual over-optic pieces 202, 204, 206, 208. The over-optic pieces 202-208, as separate components or as a single component, may be made from plastic, acrylic, or another suitable material using methods such as extrusion, injection molding, etc.

Figure 3:
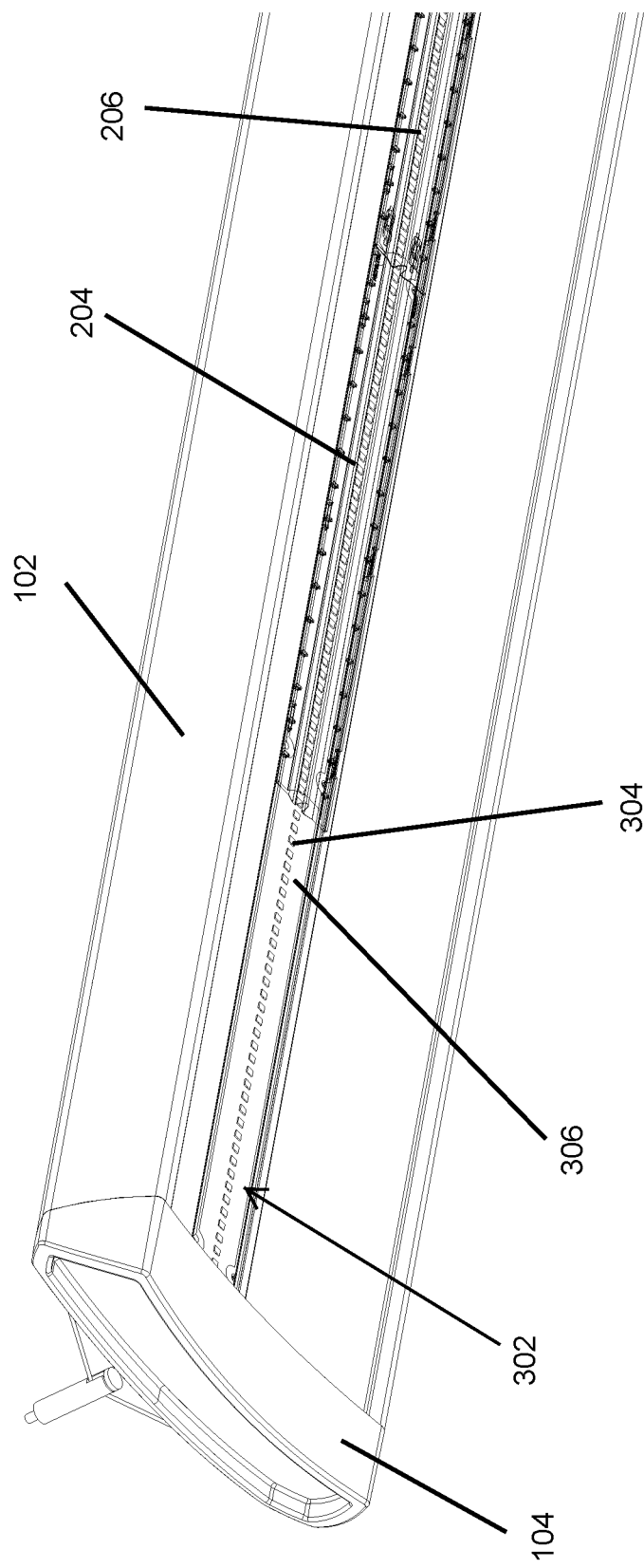
FIG. 3 illustrates the linear luminaire of FIG. 1 without the lens and an over-optic piece according to an example embodiment.

FIG. 3 illustrates the linear luminaire 100 of FIG. 1 without the lens 108 and an over-optic piece 202 according to an example embodiment. Referring to FIGS. 1-3, in some example embodiments, the linear luminaire 100 includes a light emitting diode (LED) light source 302 that includes LEDs 304 that are disposed on an LED circuit board 306. In some example embodiments, the LED light source 302 may extend for the entire length of the housing 102. For example, the LED circuit board 306 may include a single-piece circuit board or multiple circuit boards that together extend the length of the housing 102, avoiding shadows as viewed through the lens 108. The LEDs 304 may be distributed evenly along the length of the LED light source 302. In some example embodiments, the LEDs 304 may have a different configuration than shown without departing from the scope of this disclosure.

The linear LED light source 302 and the over-optic pieces 202-208 allow the luminaire 100 to have a low-profile (i.e., a shorter height) and to evenly illuminate a wider lens, which results in a wide distribution of light along the entire length of the housing 102. For example, the luminaire 100 can have a height of approximately 2.5 inches.

Figure 4:
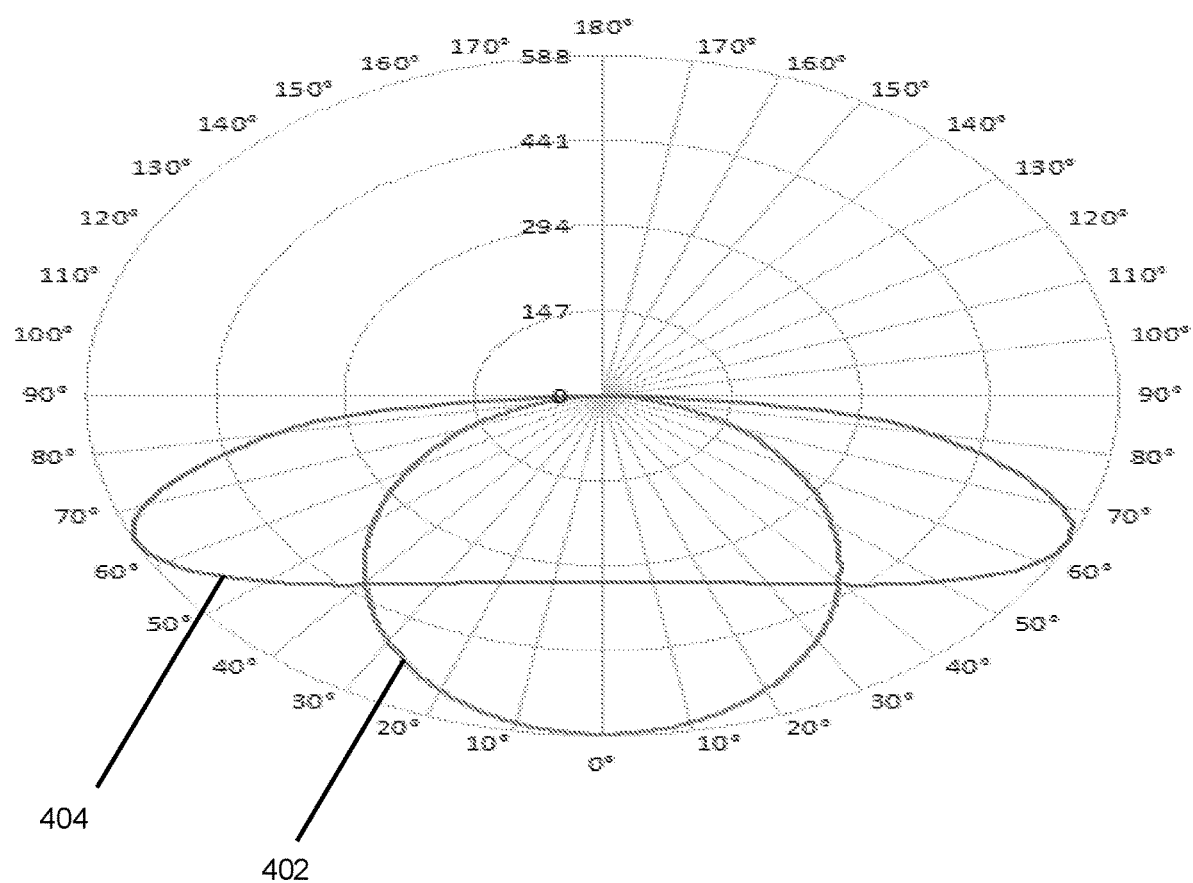
FIG. 4 illustrates polar plots of intensity distributions of a light from an LED light source of the luminaire of FIG. 1 with and without the over-optic according to an example embodiment.

FIG. 4 illustrates polar plots of intensity distributions of a light from the LED light source 302 of the luminaire 100 of FIG. 1 according to an example embodiment. Referring to FIGS. 1-4, the plot 402 illustrates an example distribution of the light from the LED light source 302 without the over-optic pieces 202-208. The plot 404 illustrates an example distribution of the light from the LED light source 302 with the over-optic pieces 202-208. As illustrated by the plots 402, 404, the over-optic pieces 202-208 result in a wider distribution of the light from the light source 302, which allows the lens 108 to have a wide dimension and the luminaire 100 to have a low-profile.

Figure 5:
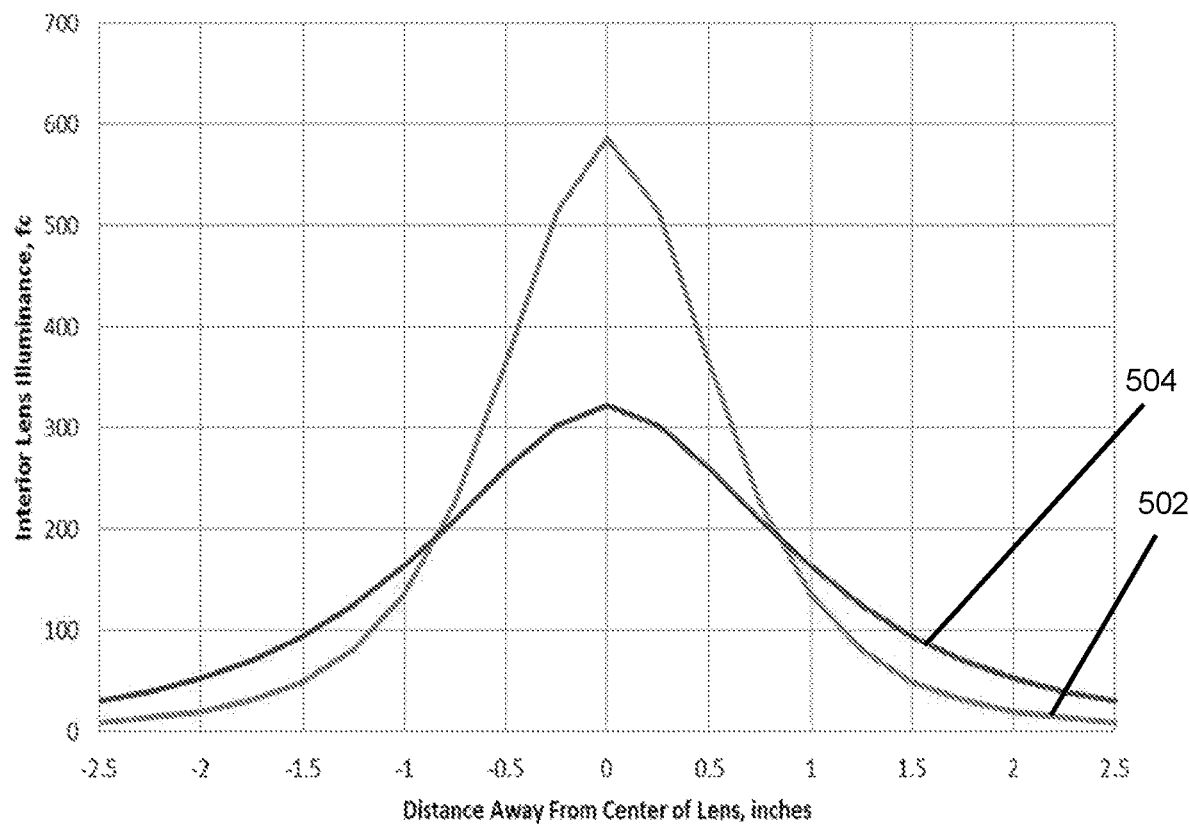
FIG. 5 illustrates plots of direct luminance on the inside of the lens of the luminaire of FIG. 1 with and without the over-optic according to an example embodiment.

FIG. 5 illustrates plots of direct luminance on the inside of the lens 108 of the luminaire 100 of FIG. 1 with and without the over-optic according to an example embodiment. Referring to FIGS. 1-3 and 5, the plot 502 illustrates an example direct luminance of the light from the LED light source 302 on the inside of the lens 108 without the over-optic pieces 202-208. The plot 504 illustrates an example direct luminance of the light from the LED light source 302 on the inside of the lens 108 with the over-optic pieces 202-208. As illustrated by the plots 502, 504, the over-optic pieces 202-208 result in a wider distribution of the light from the light source 302, which allows the lens 108 to have a wide dimension and the luminaire 100 to have a low-profile.

Figure 6:
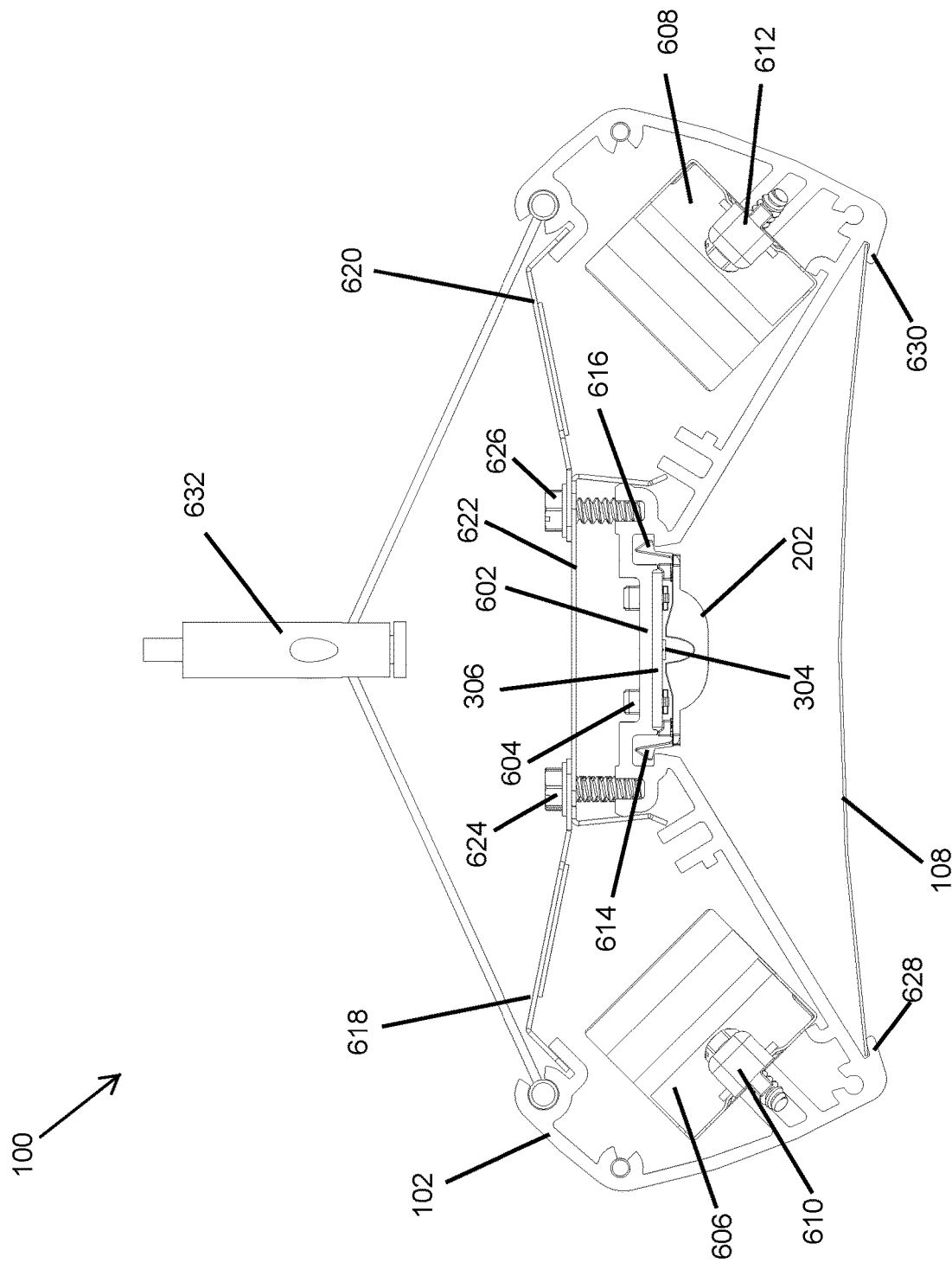
FIG. 6 illustrates an end view of the linear luminaire of FIG. 1 according to an example embodiment.
Figure 7:
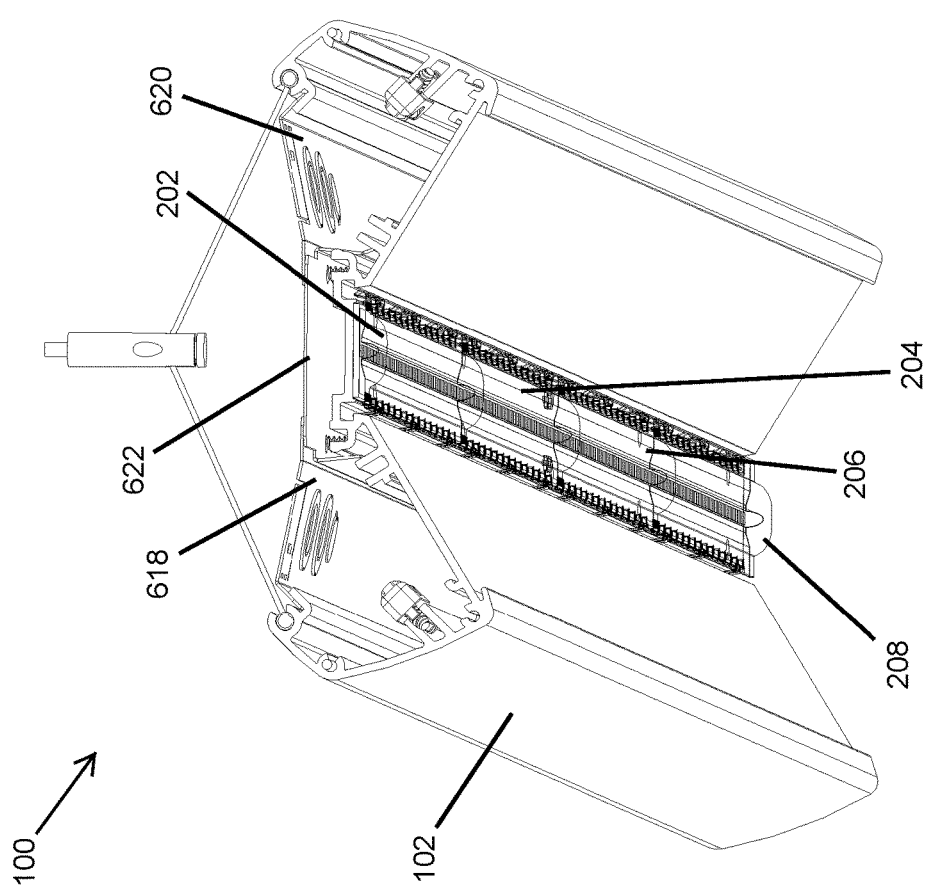
FIG. 7 illustrates a bottom isometric view of the linear luminaire of FIG. 1 without the lens according to an example embodiment.

FIG. 6 illustrates an end view of the linear luminaire 100 of FIG. 1 with the end caps 104, 106 according to an example embodiment, and FIG. 7 illustrates a bottom isometric view of the linear luminaire 100 of FIG. 1 without the lens 108 according to an example embodiment. Referring to FIGS. 1-7, in some example embodiments, the LED light source 302 that includes the LED board 306 may be attached to a back section 602 of the housing 102. For example, the LED board 306 may be attached to the back section 602 of the housing 102 by an adhesive and/or one or more fasteners.

In some example embodiments, the lens 108 may be positioned on a ledge 628 on a first longitudinal side of the luminaire 100 and on a ledge 630 on a second opposite longitudinal side of the luminaire 100. For example, the lens 108 may be slid or pulled along the ledges 628, 630 that may be extend for an entire or parts of the housing 102. In some example embodiments, the lens 108 may be slightly arched, for example, upward after attachment to the housing 102. In some alternative embodiments, the lens 108 may be attached to the housing 102 by other means as may be contemplated by those of ordinary skill in the art with the benefit of this disclosure.

In some example embodiments, the over-optics 202-208 may each include snaps 614, 616 that snap over a respective ledge of the housing 102 to securely attach the over-optics 202-208 to the housing 102. In some alternative embodiments, the over-optics 202-208 may be attached to the housing 102 using other means as may be contemplated by those of ordinary skill in the art with the benefit of this disclosure.

In some example embodiments, the luminaire 100 may include a driver 606 that provides power to the LED light source 302 including the LEDs 304. For example, the driver 606 may be coupled to one or more connectors 604 of the LED board 306 by one or more electrical wires (not shown). The luminaire 100 may also include another driver 608 that provides power to the LED light source 302. For example, the driver 606 may provide power to some of the LEDs 304, and the driver 608 may provide power to remaining ones of the LEDs 304. Alternatively, the outputs of the drivers 606, 608 may be combined to provide power to the LED light source 302. In some example embodiments, one or more of drivers 606, 608 may have wireless communication capability, for example, to control the power provided to the LED light source 302. In some alternative embodiments, the luminaire 100 may include more or fewer drivers than shown.

In some example embodiments, the drivers 606, 608 may be positioned in cavities of the housing 102. For example, the driver 606 may be attached to the housing 102 by a fastener 610 in one cavity, and the driver 608 may be attached to the housing 102 by a fastener 612 in another cavity. Alternatively, the drivers 606, 608 may be positioned in the same cavity of the housing 102.

In some example embodiments, luminaire 100 may include cover structures 618, 620 that cover the cavities of the housing 102. The luminaire 100 may also include a center cover piece 622 that may extend behind as well as on longitudinal sides of the LED light source 302. The center cover piece 622 may be attached to the housing 102 by one or more fasteners such as fasteners 624, 626 or by other means as may be contemplated by those of ordinary skill in the art with the benefit of this disclosure. The center cover piece 622 may provide a defined conduit for routing electrical wires along the length of the housing 102. For example, the center cover piece 622 may include openings or slots that allow the routing of wires to/from the one or more drivers 606, 608. The cover structures 618, 620 and the center cover piece 622 may be made from sheet metal, plastic, or another material.

In some example embodiments, the luminaire 100 may be suspended from a ceiling or another structure using a suspension structure 632 that has cables that extend out and attach to the housing 102. In some example embodiments, another suspension structure may be used at the opposite end of the housing 102 to similarly suspend the luminaire 100 from a ceiling or another structure.

In some alternative embodiments, the housing 102 may have a different shape than shown without departing from the scope of this disclosure. In some alternative embodiments, the luminaire 100 may be suspended by means other than shown without departing from the scope of this disclosure. In some alternative embodiments, one or more of the over-optic pieces 202-208 may have a different shape than shown without departing from the scope of this disclosure.

Figure 8:
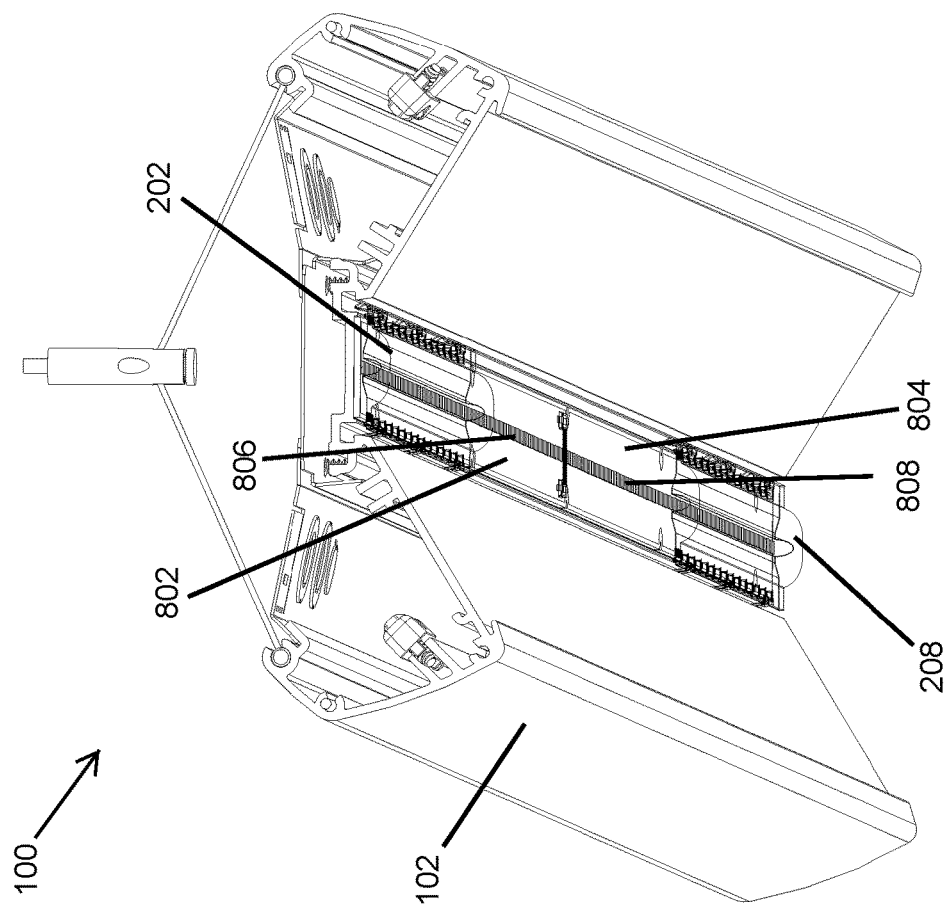
FIG. 8 illustrates a bottom isometric view of the linear luminaire of FIG. 1 without the lens and over-optic pieces according to an example embodiment.

FIG. 8 illustrates a bottom isometric view of the linear luminaire 100 of FIG. 1 without the lens and over-optic pieces 204, 206 according to an example embodiment. Referring to FIGS. 1-8, in some example embodiments, the LED circuit board 306 of the light source 302 may include multiple LED circuit boards such as LED circuit boards 802, 804. For example, each LED circuit board 802, 804 may include respective LEDs 806, 808, where the LEDs at adjacent edges of the LED circuit boards 802, 804 are spaced by substantially the same distance from each other as the other LEDs on the respective LED circuit board 802, 804. In some alternative embodiments, the LED circuit board 306 may be a single circuit board that extends the entire length of the housing 102.

The linear LED light source 302 and the over-optic pieces 202-208 allow the luminaire 100 to have a relatively wide dimension and a low-profile, where the lens 108 is relatively wide and close to the LED light source 302. By providing more evenly distributed lighting, the number of luminaires that are needed to adequately illuminate an area may be reduced.

In some example embodiments, the luminaire 100 may have a length (i.e., generally between the end caps 104, 110) in the range of 4 ft. to 12 ft. For example, the luminaire 100 may have a length of approximately 4 ft. As another example, the luminaire 100 may have a length of approximately 8 ft. As another example, the luminaire 100 may have a length of approximately 12 ft. In some alternative embodiments, the luminaire 100 may have a length that is less than 4 ft. or more than 12 ft.

In some example embodiments, the number of over-optic pieces may depend on the length of the luminaire 100. The number of individual circuit boards that the LED circuit board 306 includes may also depend on the length of the luminaire 100. For example, the LED circuit board 306 may include a single circuit board when the luminaire 100 is 4 ft. long and may include two linearly adjacent circuit boards when the luminaire 100 is 8 ft. long. The lens 108 may be a linearly single-piece lens regardless of the length of the luminaire 100.

Figure 9:
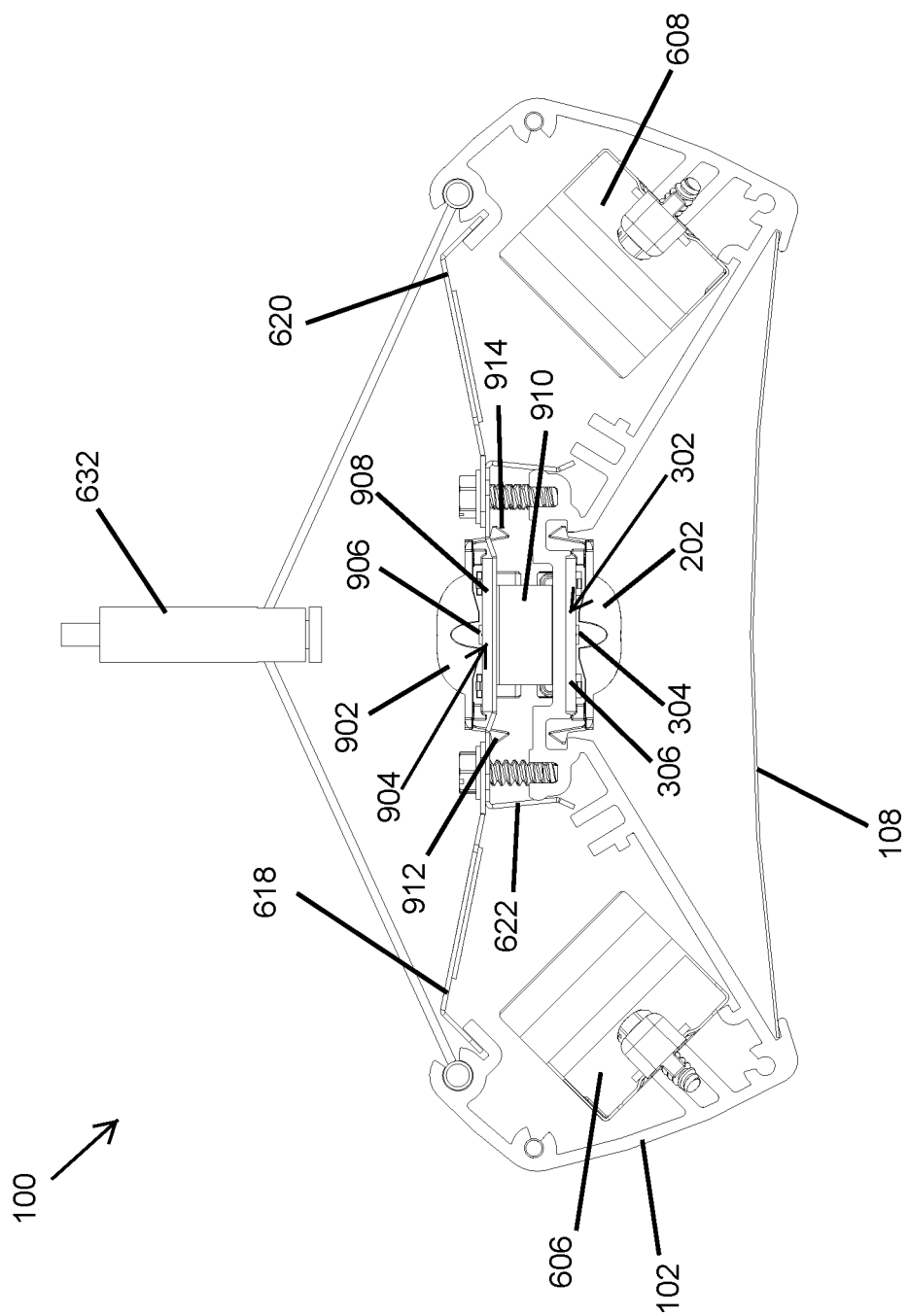
FIG. 9 illustrates an end view of the linear luminaire of FIG. 1 with up-light and down-light sources according to an example embodiment.
Figure 10:
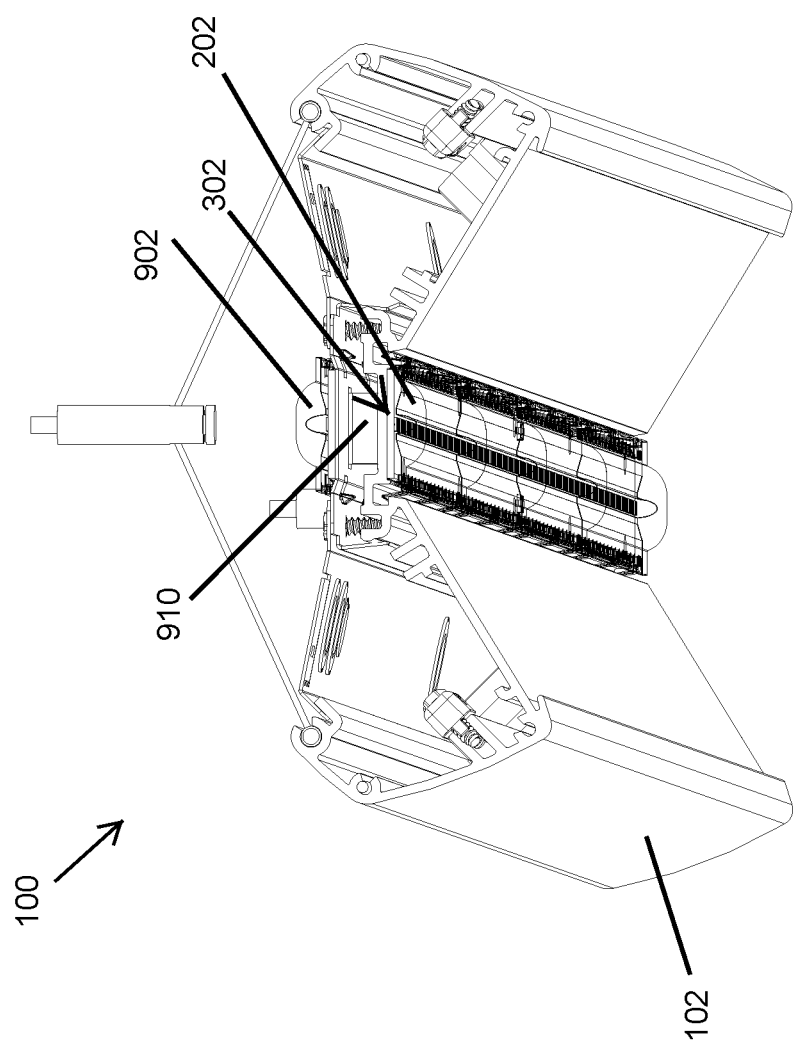
FIG. 10 illustrates a bottom isometric view of the linear luminaire of FIG. 1 with up-light and down-light sources and without the lens according to an example embodiment.

FIG. 9 illustrates an end view of the linear luminaire 100 of FIG. 1 with up-light and down-light sources according to an example embodiment, and FIG. 10 illustrates a bottom isometric view of the linear luminaire 100 of FIG. 1 with up-light and down-light sources and without the lens 108 according to an example embodiment. Referring to FIGS. 1-10, in some example embodiments, the luminaire 100 includes the lens 108, the over-optic pieces 202-208, and the LED light source 302 that provides the down-light from the luminaire 100. The LED light source 302 includes the LEDs 304 that are disposed on the LED board 306 as described above.

In some example embodiments, the luminaire 100 may also include an LED light source 904 that is covered by one or more over-optic pieces including an over-optic piece 902 and that provides an up-light of the luminaire 100. The LED light source 904 may include LEDs 906 that are disposed on one or more LED circuit boards 908. For example, the LED light source 904 may emit an up-light toward a ceiling when the luminaire 100 is suspended from the ceiling by one or more suspension structures such as the suspension structure 632. The LEDs 906 may be distributed evenly along the LED circuit board 908.

In some example embodiments, the over-optic piece 902 and other over-optic pieces covering the LEDs 906 of the light source 904 may be attached to the center cover piece 622. For example, the LED light source 904 may be positioned on the center cover piece 622. The over-optic piece 902 and other over-optic pieces may include snaps 912, 914 that are inserted in respective slots formed in the center cover piece 622. Alternatively, the over-optic piece 902 and the other over-optic pieces may be attached by other means without departing from the scope of this disclosure.

In some example embodiments, the luminaire 100 includes one or more of the drivers 606, 608 that are disposed in one or more cavities of the housing 102. For example, the driver 606 may provide power to the LED light source 302, and the driver 608 may provide power to the LED light source 904. Alternatively, the drivers 606, 608 may together provide power to the LED light sources 302, 904. In some alternative embodiments, the luminaire 100 may include fewer or more drivers than shown.

In some example embodiments, the luminaire 100 may include a support structure 910 that supports to the LED light source 904 as well as the over-optic pieces including the over-optic piece 902. For example, the support structure 910 may be positioned between the housing 102 and the center cover piece 622. Electrical wires may be routed through the support structure 910 between the drivers 606, 608 and the LED light sources 302, 904. The support structure 910 may be made from sheet metal, plastic, or another suitable material. In some alternative embodiments, the center cover piece 622 may be omitted without departing from the scope of this disclosure.

Figure 11:
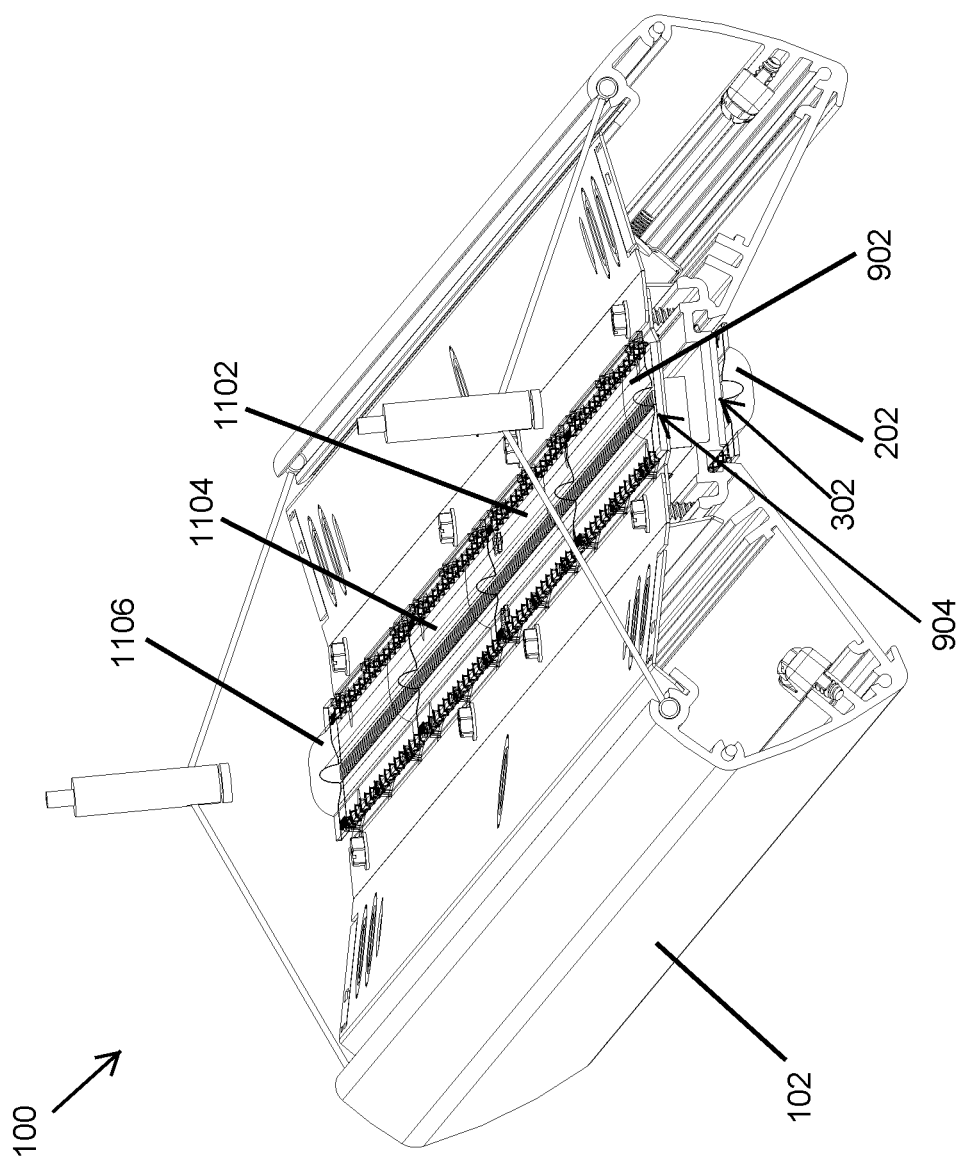
FIG. 11 illustrates a top isometric view of the linear luminaire of FIG. 1 with up-light and down-light sources and without the lens according to an example embodiment.

FIG. 11 illustrates a top isometric view of the linear luminaire 100 of FIG. 1 with up-light and down-light sources and without the lens 108 according to an example embodiment. Referring to FIGS. 1-11, in some example embodiments, the luminaire 100 includes the over-optic pieces 902, 1102, 1104, 1106. The over-optic pieces 902, 1102, 1104, 1106 control distribution of the up-light provided by the LED light source 904 along the length and width of the luminaire 100. For example, the over-optic pieces 902, 1102, 1104, 1106 may cover the LEDs 906 of the LED light source 904 and more evenly distribute the light provided by the LED light source 904 of the luminaire 100 along the width of luminaire 100 for the length of the housing 102. The over-optic pieces 902, 1102, 1104, 1106 may distribute the light more evenly such that the light does not appear excessively bright directly above the light source 904 as compared to at other locations above the light source 904.

In some example embodiments, the luminaire 100 may include a single-piece over-optic instead of multiple over-optic pieces 902, 1102, 1104, 1106. In some alternative embodiments, the luminaire 100 may include more or fewer over-optic pieces than shown without departing from the scope of this disclosure. In some example embodiments, the over-optic pieces 902, 1102, 1104, 1106 may have the same shape and may be made in the same or similar manner as the over-optic pieces 202-208. Alternatively, the over-optic pieces 902, 1102, 1104, 1106 may have a different shape than the over-optic pieces 202-208.

In some example embodiments, the luminaire 100 provides both up-light and down-light that have wider and more even distributions than otherwise provided by a linear luminaire that does not have the over-optic pieces. For example, the luminaire 100 can uniformly light a ceiling without bright spots and may allow larger distances between luminaires.

Figure 12:
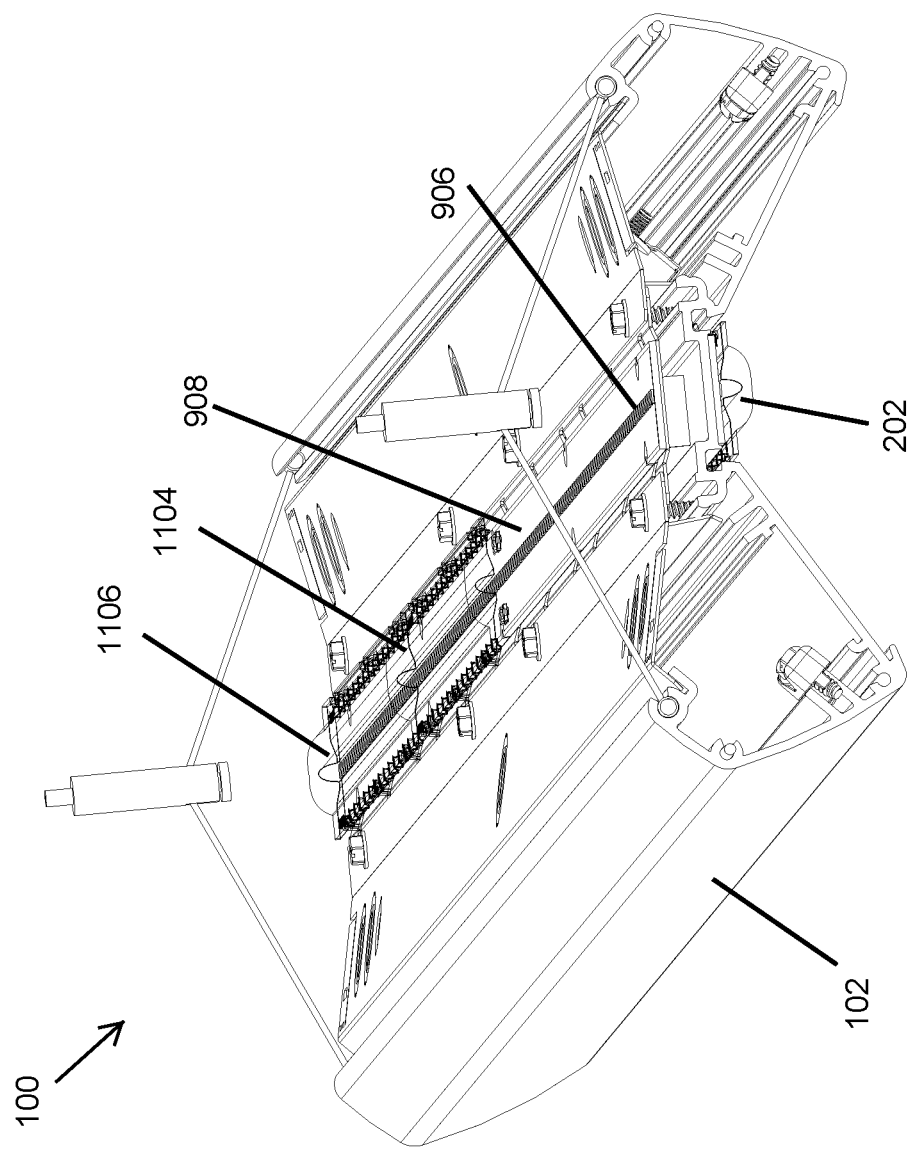
FIG. 12 illustrates a top isometric view of the linear luminaire of FIG. 1 with up-light and down-light sources and without the lens and some over-optic pieces according to an example embodiment.

FIG. 12 illustrates a top isometric view of the linear luminaire 100 of FIG. 1 with up-light and down-light sources and without over-optic pieces 902, 1102 according to an example embodiment. Referring to FIGS. 1-12, the LED circuit board 908 may be a single circuit board that extends along the length of the housing 102 or may include multiple circuit boards. In embodiments where the LED circuit board 908 includes multiple circuit boards, each LED circuit board may include respective LEDs 906 such that the LEDs at adjacent edges of the multiple LED circuit boards are spaced by substantially the same distance from each other as the other LEDs on the respective LED circuit board.

In some example embodiments, the number of over-optic pieces covering the LEDs 906 of the LED light source 904 and the number of LED circuits of the LED light source 904 depend on the length of the luminaire 100 in a similar manner as described above. In some example embodiments, the LEDs 906 may have a different configuration than shown without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A linear luminaire, comprising:
   a housing;
   a down-light light emitting diode (LED) light source comprising a first circuit board attached to the housing, wherein the down-light LED light source is positioned in the housing to emit a first light toward an area below the linear luminaire;
   a first over-optic piece covering multiple LEDs of the down-light LED light source, wherein the first over-optic piece is attached to the housing and wherein the first over-optic piece is spaced from the multiple LEDs of the down-light LED light source;
   an up-light LED light source comprising a second circuit board separated from the first circuit board, wherein the up-light LED light source is positioned to emit a second light toward an area above the linear luminaire;
   a second over-optic piece covering multiple LEDs of the up-light LED light source, wherein the second over-optic piece is spaced from the multiple LEDs of the up-light LED light source; and
   a lens spaced from the first over-optic piece and covering the first over-optic piece from view, wherein the first over-optic piece changes a distribution of the first light as the first light passes through the first over-optic piece.

2. The linear luminaire of claim 1, wherein the lens is a single-piece seamless lens.

3. The linear luminaire of claim 1, wherein the distribution of the first light is more even after passing through the over-optic piece.

4. The linear luminaire of claim 1, wherein the first over-optic piece is removably attached to the housing.

5. The linear luminaire of claim 1, wherein the multiple LEDs of the down-light LED light source are attached to the first circuit board and wherein the multiple LEDs of the up-light LED light source are attached to the second circuit board.

6. The linear luminaire of claim 1, wherein the housing is approximately 4 feet long.

7. The linear luminaire of claim 1, wherein the over-optic piece comprises two or more over-optic pieces that are linearly coupled to each other.

8. The linear luminaire of claim 1, further comprising a first driver that provides power to the down-light LED light source and a second driver that provides power to the up-light LED light source.

9. The linear luminaire of claim 1, further comprising a driver that provides power to the down-light LED light source and to the up-light LED light source.

10. The linear luminaire of claim 1, wherein the down-light LED light source is spaced from the up-light LED light source.

* * * * *